US008121268B1

(12) United States Patent
Ferguson et al.

(10) Patent No.: US 8,121,268 B1
(45) Date of Patent: Feb. 21, 2012

(54) WEB PAGE CREATION BY TELEPHONE

(75) Inventors: David R. Ferguson, El Dorado Hills, CA (US); Johnny Chen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1509 days.

(21) Appl. No.: 11/538,415

(22) Filed: Oct. 3, 2006

(51) Int. Cl.
*H04M 11/00* (2006.01)
(52) U.S. Cl. ............... 379/90.01; 379/88.17; 379/88.19
(58) Field of Classification Search ............... 379/90.01, 379/88.17, 88.19, 88–23, 88.24; 704/270, 704/271, 275; 370/351–360; 709/218, 232; 705/14
See application file for complete search history.

(56) References Cited

U.S. PATENT DOCUMENTS

| | | | | |
|---|---|---|---|---|
| 5,850,430 A | * | 12/1998 | Hamalainen | 379/93.02 |
| 6,061,057 A | * | 5/2000 | Knowlton et al. | 715/744 |
| 6,522,738 B1 | * | 2/2003 | Cruickshank et al. | 379/201.03 |
| 6,996,609 B2 | * | 2/2006 | Hickman et al. | 709/218 |
| 2005/0256766 A1 | * | 11/2005 | Garcia et al. | 705/14 |

* cited by examiner

*Primary Examiner* — Melur Ramakrishnaiah
(74) *Attorney, Agent, or Firm* — Morgan, Lewis & Bockius LLP (57) ABSTRACT

A web page is composed for an entity using information obtained by a computer-based service provider during a telephone call. In some embodiments, a user calls the service provider using a telephone having a telephone number associated with the entity. The user receives an audible message listing a first set of information, and sends a response that indicates whether the first set of information is accurate with respect to the entity. In response to one or more audible prompts, the user also provides a second set of information concerning the entity. Optionally, the user may send a completion command to the service provider via the telephone. The service provider generates a publicly accessible web page based on first and second sets of information.

26 Claims, 9 Drawing Sheets

WEB PAGE CREATION BY TELEPHONE

TECHNICAL FIELD

The disclosed embodiments relate to the creation of web pages viewable on the World Wide Web using a phone calling a service provider server.

BACKGROUND

The World Wide Web allows businesses to market their products and services on the Internet by providing access to publicly viewable web pages. Businesses who are able to create web pages can publish them by storing them on web servers. Users can access a web page by entering the web page's uniform resource locator (URL) into a client web browser, or by clicking on a link to the web page while using a web browser or other application. Additionally, a web page may be accessed by users who receive search results from an Internet search engine, where the search results include a link to the web pages. Online advertisements may also provide access to a web page. When a user clicks on an online advertisement having a link to the web page, the user's web browser downloads and displays the web page.

Internet access to corporate web pages may provide companies with increased market visibility, leading to new business opportunities and increased business revenues. However, current methods of creating web pages typically require some degree of technical sophistication or computer programming knowledge. Businesses without access to a technical staff may have difficulty creating custom web pages or other internet marketing tools.

SUMMARY OF EMBODIMENTS

A web page is composed for an entity using information obtained by a computer-based service provider during a telephone call. In some embodiments, a user calls the service provider using a telephone having a telephone number associated with the entity. The user receives an audible message listing a first set of information, and sends a response that indicates whether the first set of information is accurate with respect to the entity. In response to one or more audible prompts, the user also provides a second set of information concerning the entity. Optionally, the user may send a completion command to the service provider via the telephone. The service provider generates a publicly accessible web page based on first and second sets of information.

In some embodiments, a user receives by post a mailing that includes a passcode. The user calls a service provider using a telephone, and conveys the passcode via the telephone to the service provider. The user then receives an audible message listing a first set of information, and sends a response that indicates whether the first set of information is accurate with respect to the entity. In response to one or more audible prompts, the user also provides a second set of information concerning the entity. Optionally, the user may send a completion command to the service provider via the telephone. The service provider generates a publicly accessible web page based on first and second sets of information.

In another aspect of the invention, a server associated with a server provider receives a telephone call from a telephone having an associated telephone number, which is also associated with an entity. The server sends an audible message listing a first set of information, and receives a response (from a user of the telephone) that indicates whether the first set of information is accurate with respect to the entity. The server sends an audible prompt to request a second set of information concerning the entity, receives the second set of information concerning the entity, and generates a publicly accessible web page based on the first and second sets of information.

In some embodiments, the server sends to the entity by post a mailing that includes a passcode. The server receives a telephone call, and receives the passcode from a user of the telephone. It then sends an audible message listing a first set of information, and receives a response from the user, wherein the response indicates whether the first set of information is accurate with respect to the entity. The server also sends an audible prompt to request a second set of information concerning the entity, receives the second set of information concerning the entity, and generates a publicly accessible web page based on the first and second sets of information.

DESCRIPTION OF EMBODIMENTS

Figure 1:
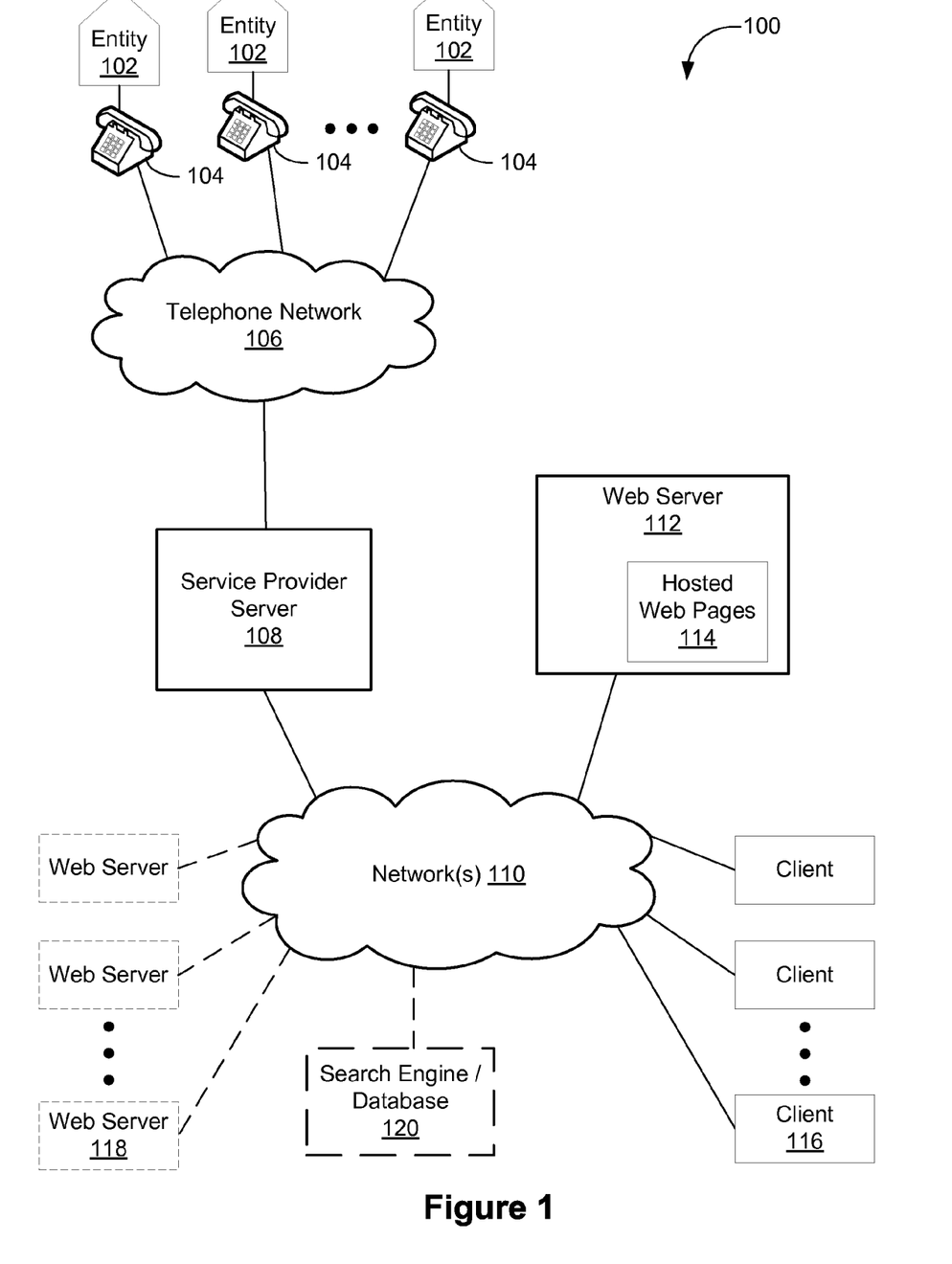
FIG. 1 is a block diagram illustrating a system wherein a telephone can be used to create publicly viewable web pages in accordance with some embodiments.

FIG. 1 is a block diagram illustrating a system 100 in which a telephone call can be used to create publicly viewable web pages in accordance with some embodiments 100. The system 100 includes one or more entities 102, each with a respective telephone 104 that has a telephone number associated with the entity. The telephones are connected through a telephone network 106 to a service provider server 108. The service provider server creates entity specific web pages 114 that may be stored on a web server 112 and made available to a plurality of clients 116 through a network 110 such as the Internet.

The entities 102 may be any business or individual with a telephone. A set of information associated with a respective entity can be used to create custom web page information. For example, this information may include, but is not limited to name, address, phone number, and business type. Portions of the information about the entity may already be available in one or more web servers 118, or a search engine/database 120. In some embodiments, a business type identifier is associated with the entity, based on publicly available information about the entity. For example, respective business type identifiers can be defined for restaurants offering various specific types of food, for vendors who sell to specific markets or who sell specific types of goods (e.g., sporting goods, bicycles, furniture, etc.), and so on.

The service provider server 108 includes an interface 706 (FIG. 7) to a telephone network 106 and has the ability to send and receive audible speech data to and from a telephone user at a telephone 104. The service provider may automatically detect the identity of the user by receiving from the telephone network 106 a caller identifier that includes a telephone number, and associating the telephone number with a respective entity. In addition, the service provider 108 may gather seed information about the entity through a computer network 110, one or more web servers 118, and a search engine/database 120. In some embodiments, the service provider generates a passcode for an entity and mails the passcode to the entity by post (i.e., postal service). As described below, the passcode is used to identify a caller at a later date.

Based on the information about an entity, the service provider may construct a custom web page for the entity that is stored on a respective web server 114. Further details of the service provider server are described below with reference to FIG. 7.

The web server 112 stores completed web pages generated by the service provider 108. The web server 112 allows the stored web pages 114 to be accessed by a plurality of web clients 116 through a communications network 110, which may include one or more of the following: one or more local area networks (LANs), wide area networks (WANs), intranets, wireless networks, the Internet, or any combination thereof.

Figure 2:
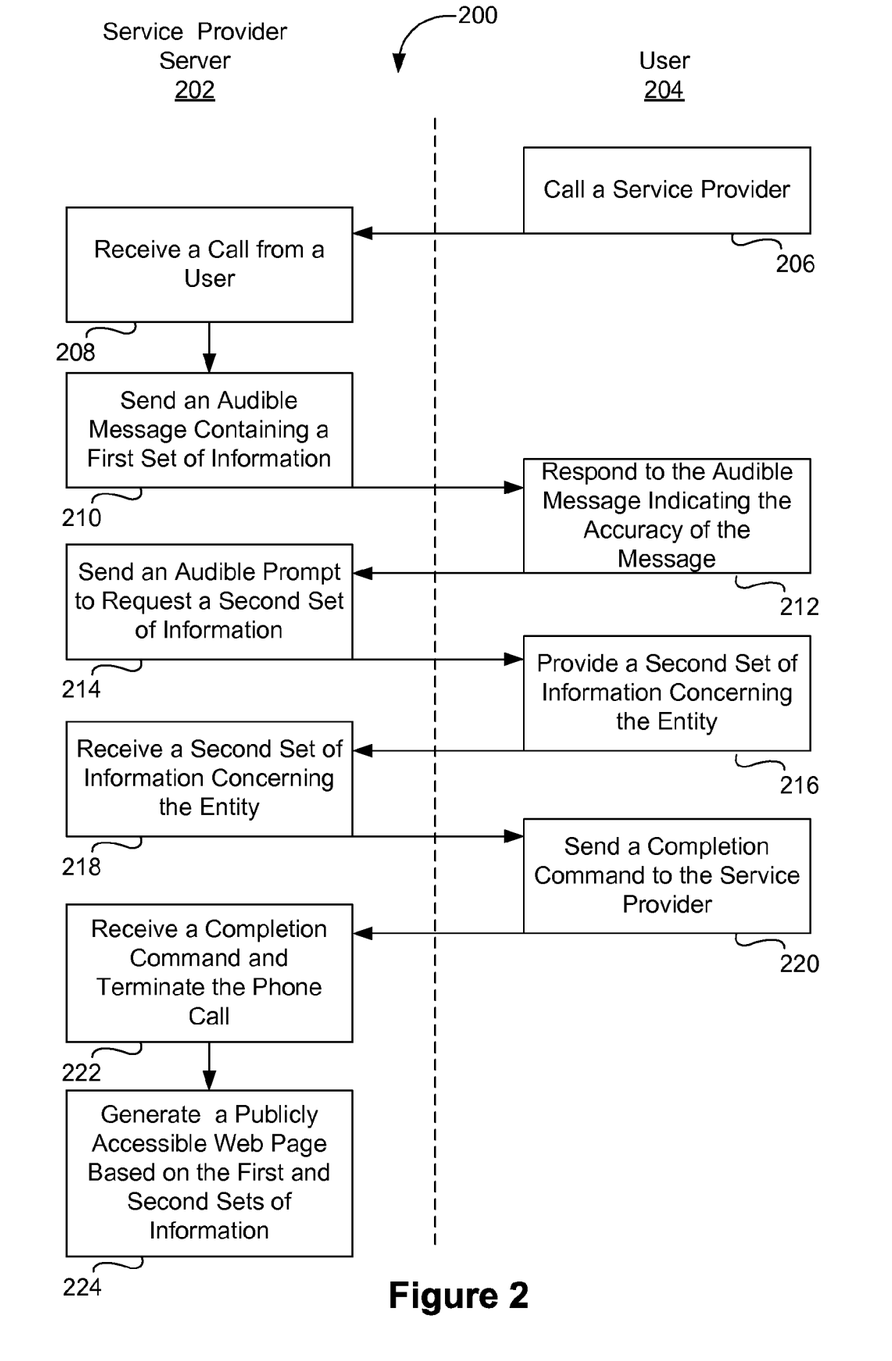
FIG. 2 is a flowchart of communications between a user and a service provider server when creating a web page using the telephone in accordance with some embodiments.

Attention is now directed to FIG. 2, which is a flow diagram of a process 200 that includes telephone communications between a user and a service provider server when creating a web page for an entity in accordance with some embodiments. The process 200 begins when a user makes a telephone call 206 which is received by a service provider 208. The service provider sends an audible message containing a first set of entity information 210. The first set of entity information is information that the service provider has associated with the entity, but which may or may not in fact be accurate information about the entity 210. The user responds to the audible message 212 so as to indicate whether the first set of entity information is accurate with respect to the entity. The user, for example, may receive information about the entity such as name, address and/or business type from the service provider server 202. The user may verify the accuracy of each information item in the first set of information by responding with either "yes" or "no" audible commands or by pushing keys on a telephone pad (e.g., "1" for "yes" and "3" for "no"). In some embodiments the user may send information back to the server correcting or augmenting the first set of entity information. In some embodiments, a user may verify a business type identifier in the first set of information. If the business type identifier is not correct, the user may speak an alternate business type identifier or select one from a list of options.

In some embodiments, the process 200 includes the service provider sending an audible request for a second set of information concerning the entity 214. The user responds by providing the second set of information 216, which is then received by the service provider server 218. In some embodiments the service provider may prompt the user for information based at least partially on a previously stored set of prompts. These prompts may change based information already known about the entity, such as the type of business, the location of the entity, the items (if any) in the first set of information which the user confirmed as accurate with respect to the entity, and/or the items (in any) in the first set of information which the user indicated are not accurate with respect to the entity. In some embodiments, a user may select an option indicating the amount of information contained on a web page. Based on this selection, the service provider may present an abbreviated set of prompts for less information or an extended set of prompts for more information. In some embodiments, the user may respond to prompts given by the service provider server by speaking audible commands or pushing keys on a touchpad. In other embodiments, a user may provide a verbal narrative that is interpreted by the service provider server.

In some embodiments, once the information exchange is complete, the user sends a completion command 220 which is received by the service provider server 222, thereby terminating the telephone call. The service provider then generates a publicly accessible web page based on the first and second sets of information 224.

In some embodiments, not illustrated in FIG. 2, the web page generated by the service provider server 222 is not made publicly accessible until a user associated with the entity confirms that the web page is to be published. In an exemplary embodiment, the server provider server 222 generates a passcode for the entity, prints one or more images of the web page(s) it has generated, and mails the passcode and image(s) to the entity by post, along with instructions on how to call the service provider server so as to publish the web page(s). When and if a user calls the service provider server and provides the passcode, the previously generated web page or pages are made publicly accessible (e.g., published on a web server 112 (FIG. 1).

Figure 3A:
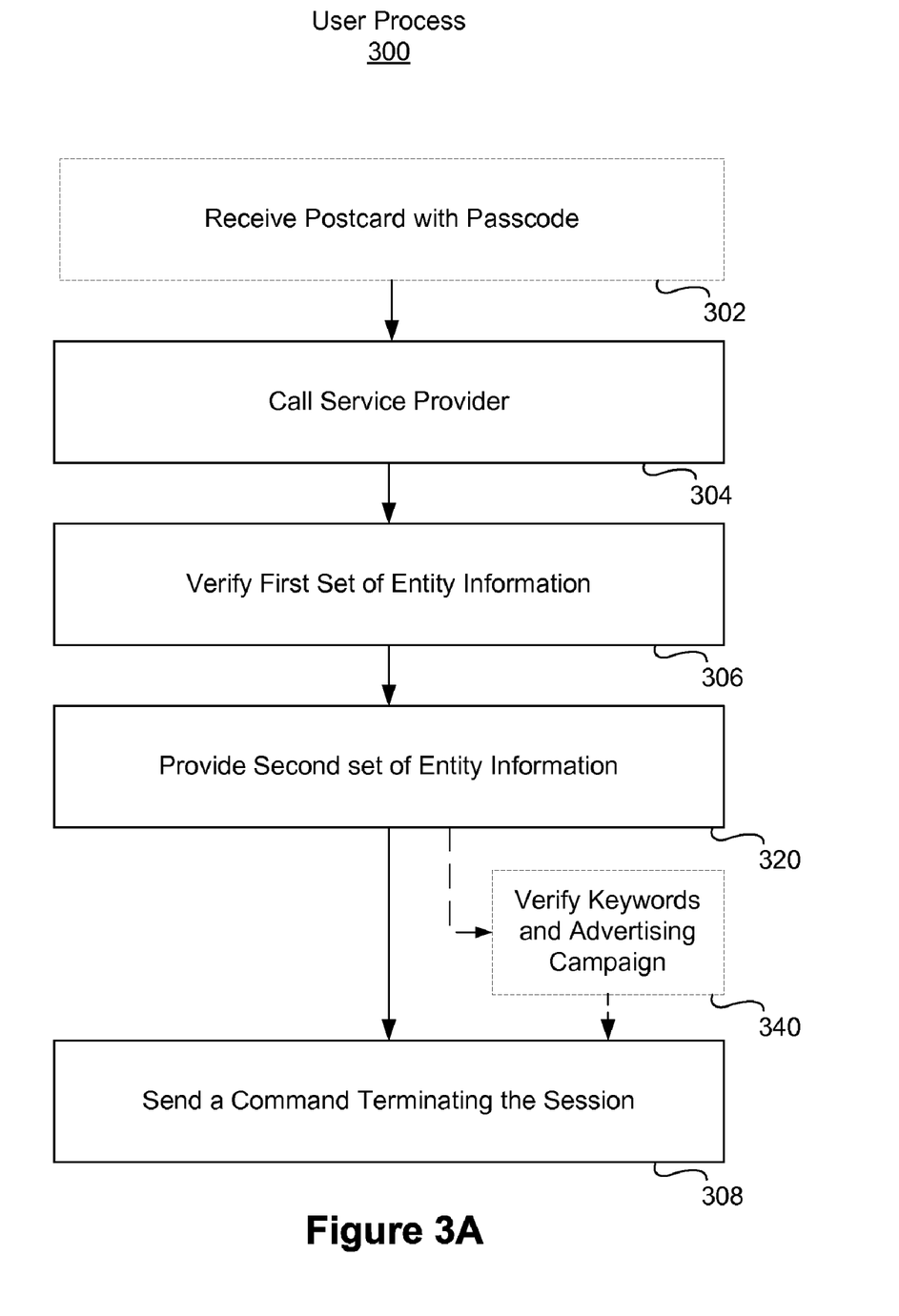
FIG. 3A is a flow diagram illustrating the steps taken by a telephone user communicating with a service provider in accordance with some embodiments.

Attention is now directed to FIG. 3A, which is a flow diagram illustrating the steps taken by a telephone user when creating a web page in accordance with some embodiments 300. The process begins when a user makes a telephone call to a service provider server 304. In some embodiments, a user may have already received a passcode from the service provider before making the telephone call 302. In these embodiments, the user provides the passcode to the service provider server (e.g., orally, or by pressing buttons on the telephone) at the beginning of the telephone call. In these embodiments, the passcode is used by the service provider server to identify the entity for which a web page is to be generated. In some other embodiments (e.g., embodiments that do not provide the user with a passcode prior to the telephone call), the telephone number of the telephone used to call the service provider server is used to identify the entity for which a web page is to be generated.

During the course of the telephone call to the service provider server, the user verifies a first set of entity information received from the service provider server 306. For example, the user may receive information about the entity such as name, address and/or business type from the service provider server. The user may verify the accuracy of individual items in the first set of entity information the messages by responding with either "yes" or "no" audible commands or by pushing keys on a telephone pad. In some embodiments, while verifying the first set of entity information, the user may send information back to the server correcting or augmenting the first set of information.

In some embodiments, during the telephone call to the service provider server, the user provides a second set of entity information to the service provider 320. For example, the user may respond to prompts given by the service provider by speaking audible commands or pushing keys on a touchpad. Optionally, a user may also provide a verbal narrative that is interpreted by service provider server.

In some embodiments, during the telephone call to the service provider server, the user may verify keywords to be used in an advertising campaign 340. In some embodiments, the information exchange is followed by a user entered or spoken command terminating the session 308.

Figure 3B:
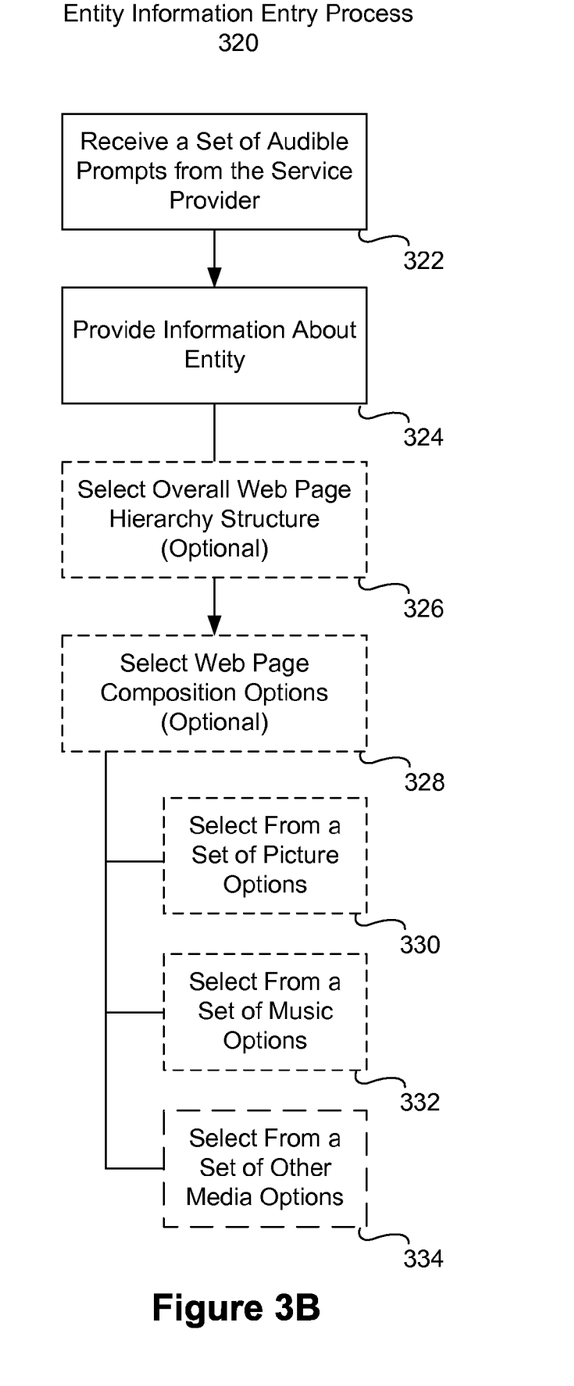
FIG. 3B is a flow diagram illustrating the steps taken by a telephone user when selecting web page hierarchy and multimedia options in accordance with some embodiments.

Attention is now directed to FIG. 3B, which is a flow diagram illustrating a process 320 performed by a telephone user when selecting web page hierarchy and multimedia options for the web page to be generated by the service provider server. These selections may be made as part of the second set of information provided to the server. For example, the user may make selections regarding a web page's hierarchy before, after or while the user is providing information about the entity. It should be noted that the process depicted in FIG. 3B is an exemplary embodiment, and that other embodiments of the process 320 may include other operations and a different ordering of operations.

During the process 320, the user receives a set of audible prompts from the service provider 322. At least some of the user's responses to the prompts provide information regarding the entity 324. Based on further audible prompts from the service provider server, the user selects an overall web page hierarchy structure 326. For example, a user may select between an option to publish a single page or to publish multiple pages linked in a hierarchical order. In some embodiments, a user may also select between a set of multimedia options 334 in the hierarchically arranged web pages. For example, a user may select one or more picture options 330, one or more music options 332, and one or more other media options. As a illustrative example, the service provider server may orally present a set of picture options to the user that include flags of the world. The user may either speak the name of the country or select an option through audible commands or by pressing a key on a touchpad. Similarly, music options may be presented to the user by playing short samples of individual music selections. The user can select an option by providing an audible command or by pressing a key on a touchpad. Other media options may be similarly presented to the user through a combination of verbal description and auditory samples. In some embodiments, the user may also select other web page authoring options, such as color scheme options for determining background and border colors of the web page.

Figure 3C:
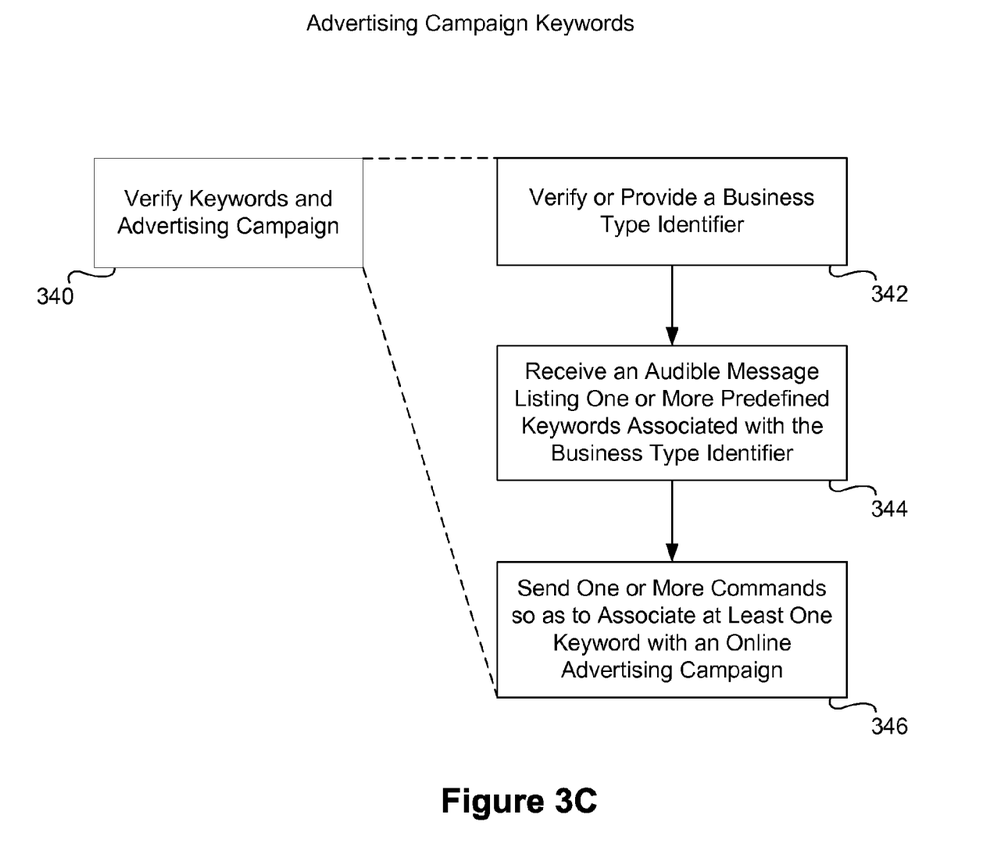
FIG. 3C is a flow diagram illustrating the steps taken by a telephone user when selecting keywords for an advertising campaign in accordance with some embodiments.

Attention is now directed to FIG. 3C, which is a flow diagram illustrating a process 340 performed by a telephone user when selecting keywords for an advertising campaign. In some embodiments, the process 340 may begin when the user verifies or provides a business type identifier 342. For example, if the business type identifier is not correct, the user may speak an alternate business type identifier or select one from a list of options. The user then receives an audible message listing one or more predefined keywords that are associated with the business type identifier 344. In some embodiments, the user may accept the predefined keywords or select alternates using audible commands or by pressing keys on the touchpad.

The user then sends one or more commands so as to associate at least one keyword with an online advertising campaign 346. In some embodiments, an online advertising campaign may consist of online advertisements that contain links to at least one web page associated with the entity. The web page to which the advertisements are linked may be a web page generated by the service provider server using an embodiment of the web page authoring process described above. The advertisements may be displayed on web pages associated with one or more of the keywords selected using process 340.

In another embodiment, the advertising campaign may allow the advertisements of other entities to be displayed in a designated area of the web page that is generated by the service provider server for the entity. The selection of advertisements to be displayed in the entity's web page may be based, at least partially, on the set of keywords selected using process 340.

Figure 4:
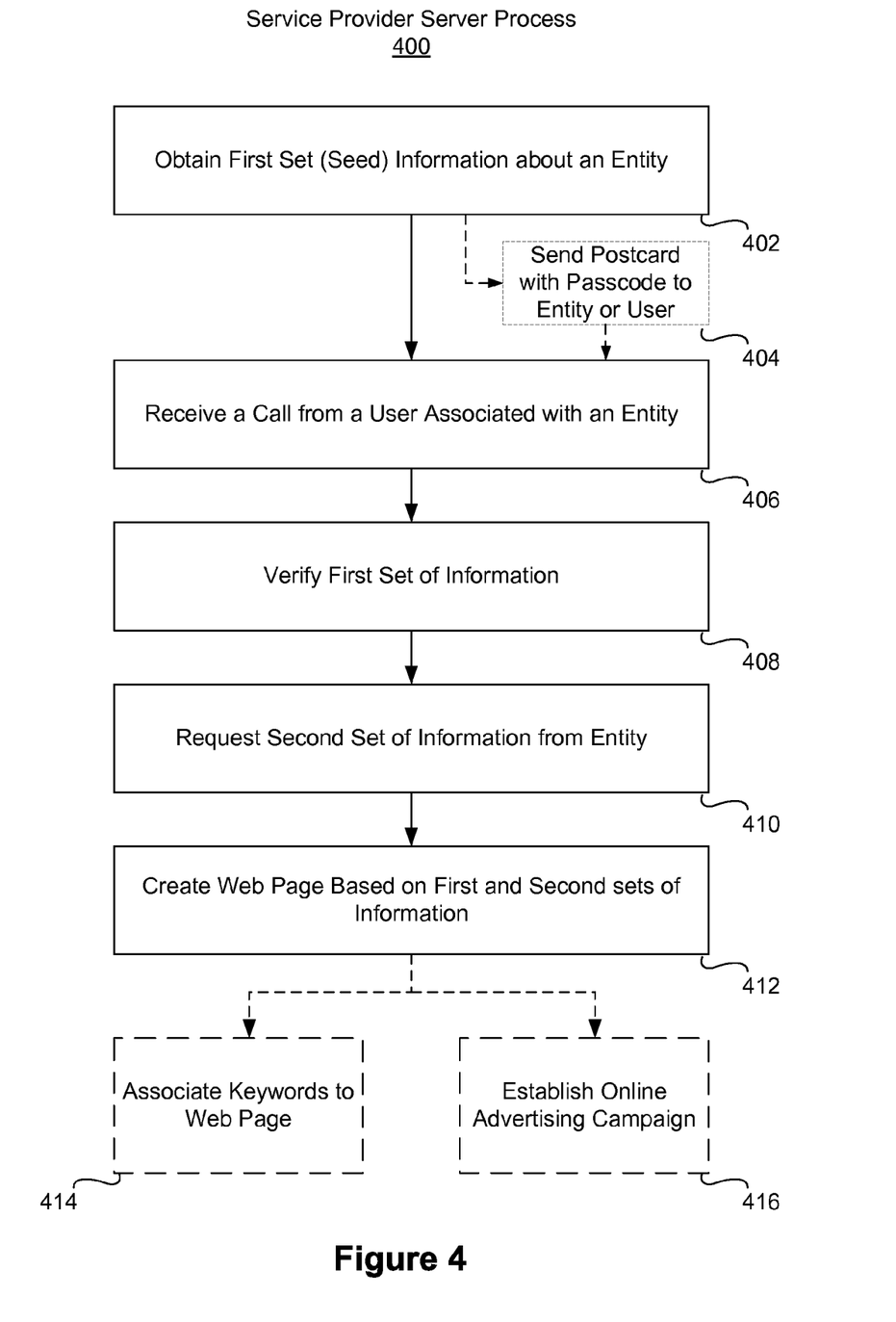
FIG. 4 is a flow diagram illustrating the steps taken by a service provider's server when creating a web page in response to user commands received over the telephone in accordance with some embodiments.

Attention is now directed to FIG. 4, which is a flow diagram of a process 400 performed by a service provider server when creating a web page in response to user commands received over the telephone in accordance with some embodiments. The process 400 begins when a service provider server obtains a first set of information about an entity, also known as seed information 402. A service provider may obtain seed information from any source that associates information with the entity. In some cases, the service provider 108 may gather further seed information about the entity through a computer network 110, one or more web servers 118, or a search engine/database 120. Optionally, a service provider may generate a unique passcode and mail it to the entity by post 404.

At some later point in time, a service provider may receive a telephone call from a user associated with the entity 406. During the telephone call, the service provider verifies the seed information previously collected regarding the entity 408. For example, the service provider may prompt a user with a first set of information that it has associated with the entity, such as name, address and/or business type. The user may verify the accuracy of the first set of information by responding with either "yes" or "no" audible commands or by pushing keys on a telephone pad. In some embodiments the user may send information back to the server correcting or augmenting the first set of entity information.

The service provider server then requests a second set of information regarding the entity 410. For example, the service provider may present one or more prompts that ask the user to respond by speaking audible commands or pushing keys on a touchpad. Optionally, a user may also provide a verbal narrative that is interpreted by service provider. In some embodiments, the request for a second set of information 410 may include one or more options allowing a user to select a web page hierarchy. For example, the service provider may present an option for a single web page or multiple pages with links. Additionally, in some embodiments, a service provider may prompt the user to select from picture, music or other media options.

Based on the first and second sets of information, the service provider server creates a custom web page for the entity 412. In some embodiments, the service provider uses information about the entity to select a web page template. The service provider may then populate fields of the selected web page template with information about the entity. In some embodiments, the service provider may construct a web page having the web page hierarchy selected by a user in the process described above in reference to FIG. 3B. The service provider server may also insert pictures, music or other media options into a web page template. See the description of FIG. 6, below, for a more detailed explanation.

In some embodiments the service provider server may also associate keywords with the web page by indexing the web page in a search engine using the keywords 414. The service provider may also initiate an online advertising campaign based on the first and second sets of information received from the user 416.

Figure 5:
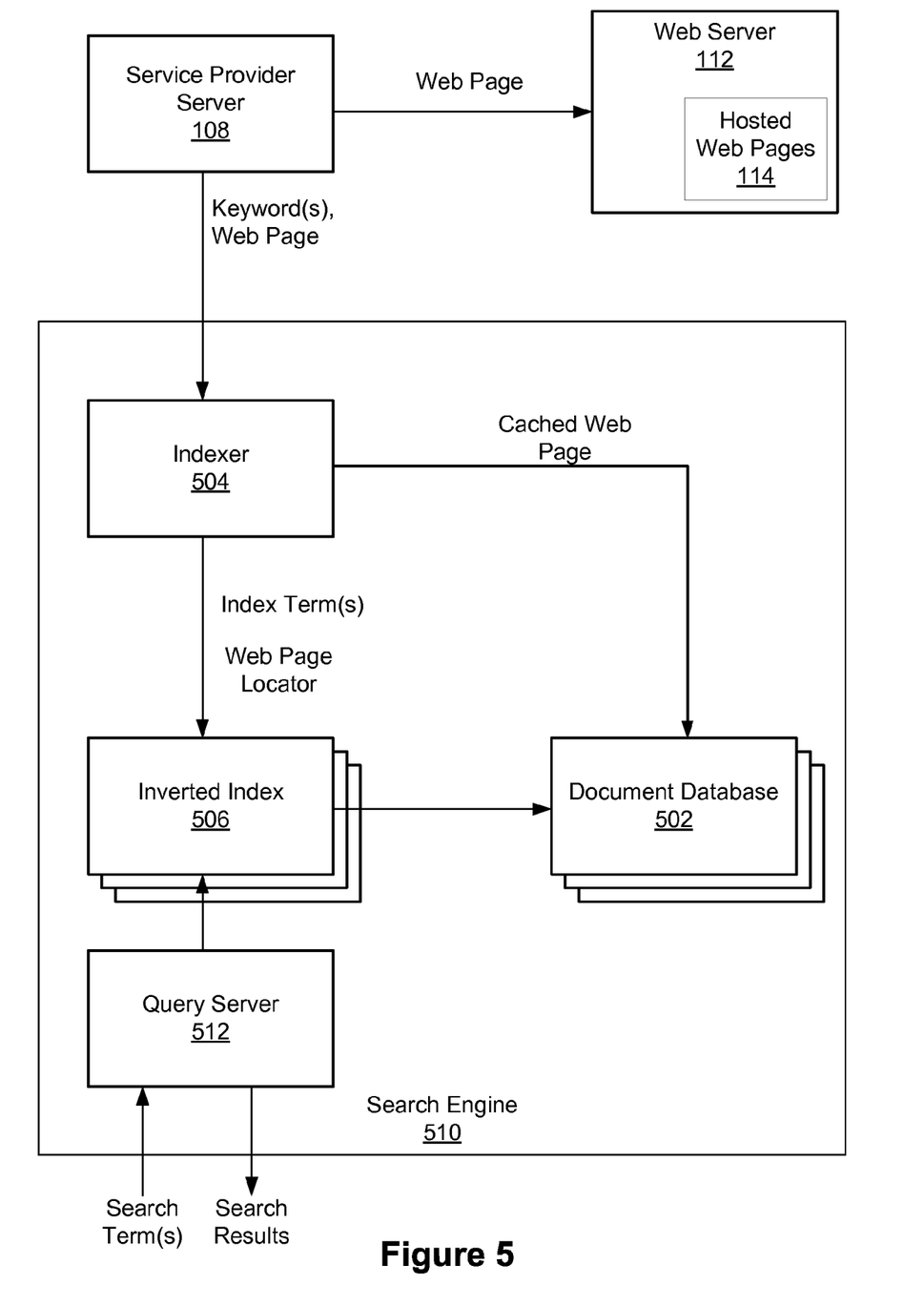
FIG. 5 illustrates how keywords may be implemented in a database search engine in accordance with some embodiments.

Attention is now directed to FIG. 5 which illustrates how keywords for an entity's web page may be implemented in a database search engine in accordance with some embodiments. The service provider server 108 generates a web page for an entity and identifies a set of keywords associated with the entity's business type identifier. In some embodiments, the web page may be sent to a web server 112 that may store the web page as a hosted web page 114. The web server 112 may be connected to a network, such as the Internet as described in reference to FIG. 1. The service provider server may also send information about the web page to a search engine 510 so as to associate the keywords with the generated web page.

For example, one or more keywords and a web page may be sent to the indexer 504 of a search engine 510. The indexer 504 generates a cached web page that is stored in a document database 502. The indexer 504 may also generate index terms based at least partially on the predefined keywords. Other index terms may include words or terms found in the content of the web page. The index terms and the location of the cached web page are then stored in an inverted index 506. In some embodiments, the search engine 510 may receive a search query containing one or more query terms from a query server 512. The query server 512 is configured to receive search queries from a user and to deliver search results. The cached web page and a link to the hosted web page may be included in the search results produced by the query server 512 when the search query contains terms that correspond to the hosted web page.

Figure 6:
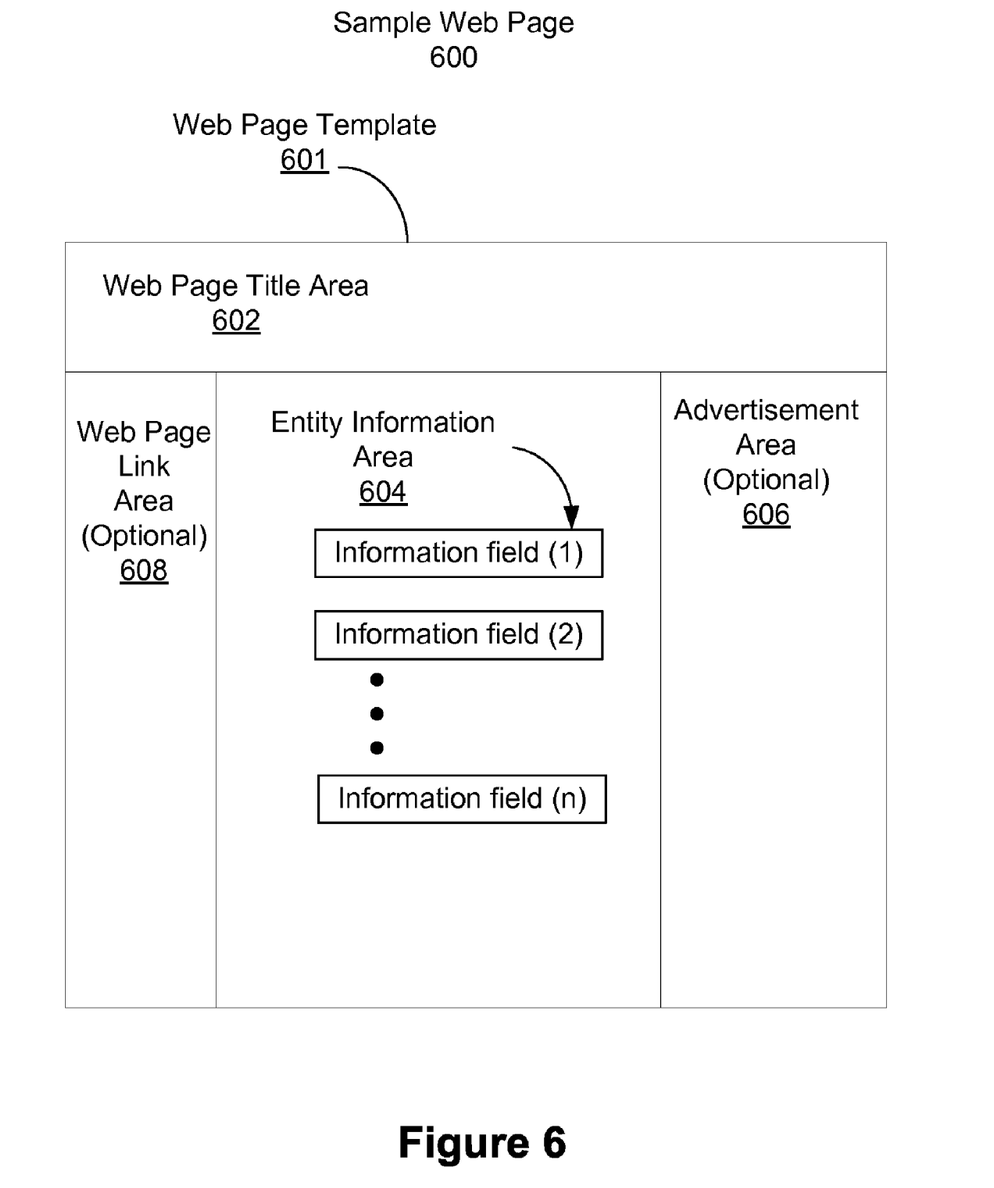
FIG. 6 illustrates a sample web page created in accordance with some embodiments.

Attention is now directed to FIG. 6, which illustrates a sample web page created in accordance with some embodiments. The web page 600 include, or be composed in accordance with a web page template 601 that includes areas for entity information fields 604, a web page title 602, and other page regions or fields. The web page template may also provide for one or more optional web page link areas 608 and one or more optional advertisement areas 606.

As noted above, in some embodiments the web page template 601 may be selected based on a business type identifier. In other embodiments, the template may be selected by the user when providing the second set of information. Reference to a web page template is not restricted to a single page and may include one or more web pages with navigational links. For example, a user may be initially directed to a master page that is then linked to one or more subordinate pages.

Based on the first and second sets of information provided and verified by a respective user, the entity information fields 604 may be populated with facts concerning the entity. For example, these facts may include entity name, address, telephone number, and listings of products and/or services provided by the entity. In some embodiments, facts about the entity can also be used to create other elements of the web page such as the title area, or web page link areas. Each element of the web page template can serve as a placeholder for certain types of entity information, such as entity name, address and so on.

In some embodiments, the first and second sets of information may be used to invoke one or more optional web page link area 608. Each link in a web page link area 608 can be used to direct a web user to another web page or can be used to invoke a script or other set of instructions. For example, different links in area 608 may provide access to different pages of a multi-page web site. The links may include text that identify the type of content on one or more subordinate pages. For example, a subordinate page may contain information related to the location of the business. In another example, the links may invoke other external web sites, such as Google Maps or Google Local, or scripts for performing predefined actions. When selected, the links may cause information relevant to the entity to be displayed in a browser window. For example, user selection of a respective link in area 608 may cause a map that shows the location of the entity to be displayed in a browser window.

The web page template may optionally provide one or more advertisement areas 606. In some embodiments, users may send one or more commands to a service provider so as to subscribe to an online advertising service. As noted above, an online advertising service may allow third parties to display advertisements on the entity's web page. The types of advertisements displayed may depend at least partially on keywords assigned by the service provider or selected by the user.

Figure 7:
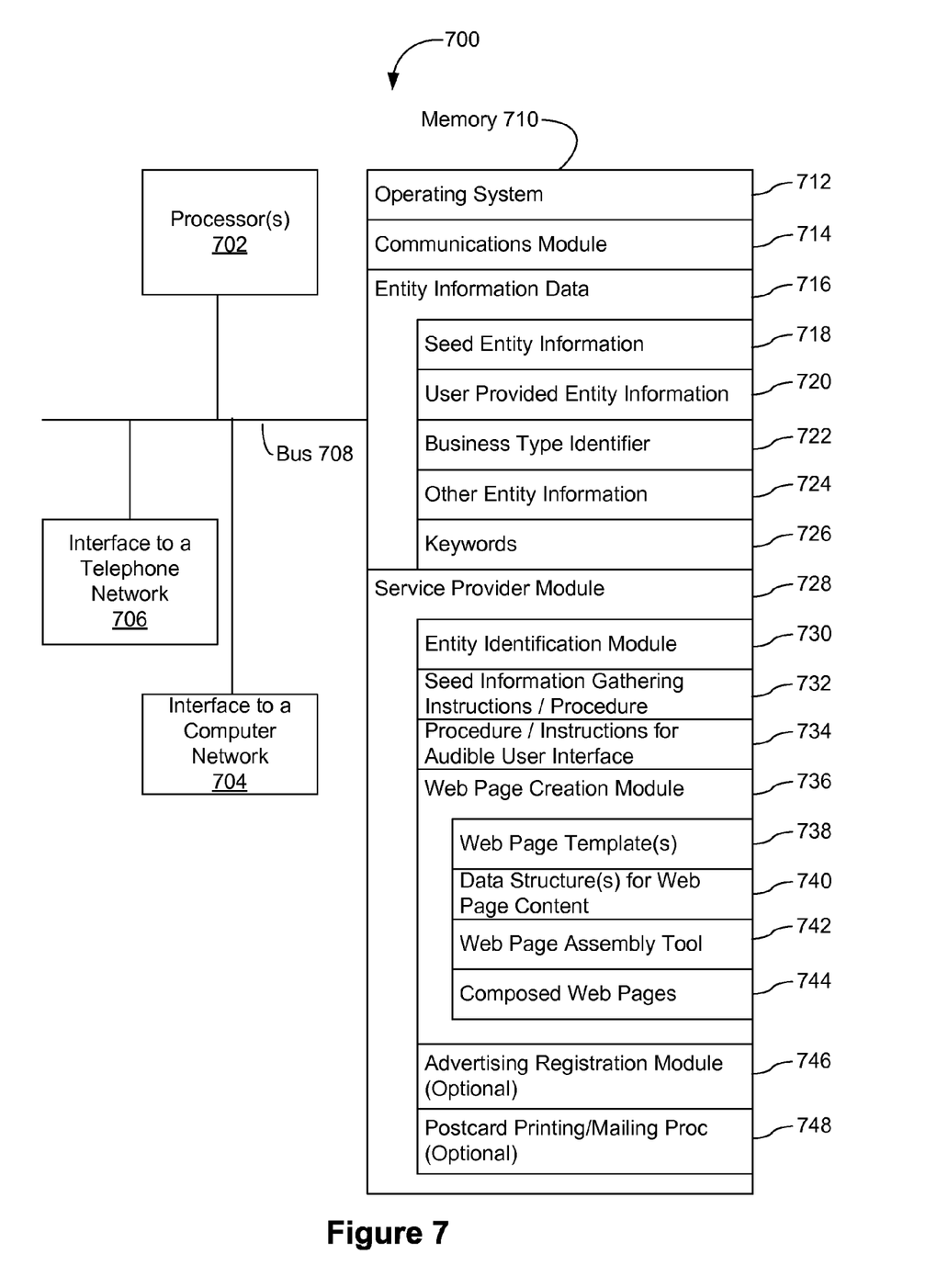
FIG. 7 is a block diagram illustrating a service provider server in accordance with some embodiments.

Attention is now directed to FIG. 7, which is a block diagram illustrating a service provider server 700 in accordance with some embodiments. The service provider server 700 typically includes one or more processors (CPU's) 702, one or more network or other communications interfaces 704, one or more telephone network interfaces 706, memory 710, and one or more communication buses 708 for interconnecting these components. The one or more communication buses 708 may include circuitry (sometimes called a chipset) that interconnect and control communications between system components. The service provider server 700 optionally may include a user interface (not shown) having a display device and a keyboard. Memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 710 may optionally include one or more storage devices remotely located from the CPU(s) 702. In some embodiments, memory 710 stores the following programs, modules and data structures, or a subset thereof:

- an operating system 712 that includes procedures for handling various basic system services and for performing hardware dependent tasks;
- a communications module 714 that is used for connecting the service provider server 700 to other computers via the one or more communication network interfaces 704 (wired or wireless) and one or more communication networks, such as the Internet, other wide area networks, local area networks, metropolitan area networks, and so on; the communications module 714 may also be used for handling telephone calls received by the service provider server via the one or more telephone network interfaces 706.

Memory 710 also includes entity information data 716. Data 716 includes the first and second sets of information for a plurality of entities. The entity information data 716 may include, but is not restricted to: seed entity information 718 containing portions of the first set of information; user provided entity information 720 containing portions of the second set of information; business type identifiers 722; other entity information 724, and keywords 726.

Memory 710 also includes a service provider module 728, which may include the following items, or a subset or superset thereof:

- an entity identification module 730 that uses caller ID information received from a telephone network or a document database to associate a received telephone call with an entity;

a seed information gathering procedure (or instructions) 732 for generating a first set of information about an entity;

an audible user interface procedure (or instructions) 734 for generating verbal prompts to guide a user through the process of providing information, verifying information and selecting options for the creation of an entity webpage, and for interpreting and processing the user's responses; and a web page creation module (or instructions) 736.

The web page creation module 736 includes one or more web page templates 738 providing web page format and structure. In some embodiments, the templates may be instruction sets for creating a template or a completed template that can be populated with entity information. The web page creation module also includes one or more data structures for web page content 740 used to store information about the entity. In some embodiments, the data structures may also include non entity information used to create entity we pages. The web page creation module 736 also includes a web page assembly tool 742 for combining the entity information data and web page templates to construct a web page. In some embodiments composed web pages 744 may also be included in the web page creation module. In some embodiments, the composed web pages 744 may not be stored in the same location as the instructions for the web page creation module 736.

In some embodiments, the memory 710 may also include:

an optional advertising registration module 746 used to enroll entities in an online advertising campaign; and an optional postcard printing/mailing procedure 748 for sending a passcode (and optionally other information, such as one or more images of the generated web page(s)) to a user via post.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of composing a web page for an entity, comprising using a telephone having an associated telephone number, wherein the telephone number is associated with the entity:

calling a service provider;

receiving an audible message listing a first set of information associated with the entity and the telephone number;

responding to the audible message so as to indicate whether the first set of information is accurate with respect to the entity;

in response to one or more audible prompts, providing a second set of information concerning the entity; and sending a completion command to the service provider;

wherein the service provider generates a publicly accessible web page based on first and second sets of information.

2. The method of claim 1, wherein the first set of information includes information obtained by the service provider from an Internet search engine.

3. The method of claim 1, wherein at least one of the first and second sets of information includes a business type identifier, and wherein the web page is formatted in accordance with a web page template corresponding to the business type identifier.

4. The method of claim 3, including identifying a set of keywords associated with the business type identifier, and associating, in a search engine, the set of keywords with the composed web page.

5. The method of claim 3, including identifying a set of keywords associated with the business type identifier;

adding the composed web page to search engine database; and associating, in the search engine database, the identified set of keywords with the composed web page.

6. The method of claim 1, including sending commands via the telephone to the service provider so as to establish an online advertising campaign that is linked to the composed web page.

7. The method of claim 6, including sending one or more commands via the telephone to the service provider so as to associate a set of one or more keywords with the online advertising campaign.

8. The method of claim 1, wherein at least one of the first and second sets of information includes a business type identifier, and the method includes associating with the online advertising campaign one or more predefined keywords corresponding to the business type identifier.

9. The method of claim 1, wherein at least one of the first and second sets of information includes a business type identifier, and the method includes:

receiving an audible message listing one or more predefined keywords corresponding to the business type identifier; and sending one or more commands to the service provider so as to associate at least one of the predefined keywords with the online advertising campaign.

10. The method of claim 1, including responding to a set of audible prompts so as to select and invoke web page composition options in a hierarchically arranged set of web page composition options.

11. The method of claim 10, wherein the hierarchically arranged set of web page composition options includes at least one set of options selected from the group consisting of a group of picture selection options and a group of music selection options.

12. The method of claim 1, including receiving by post a mailing that includes a passcode corresponding to the composed webpage; and after receiving the mailing, calling the service provider using the telephone, and manually or orally sending the passcode to the service provider;

wherein the service provider makes the composed web page publicly accessible only after receiving the passcode.

13. The method of claim 12, wherein the mailing includes one or more pictures representing the composed web page.

14. A method of composing a web page for an entity, comprising:
   receiving by post a mailing that includes a passcode;
   calling a service provider using a telephone;
   conveying the passcode via the telephone to the service provider;
   receiving an audible message listing a first set of information associated with the entity and the passcode;
   responding to the audible message so as to indicate whether the first set of information is accurate with respect to the entity;
   in response to one or more audible prompts, providing a second set of information concerning the entity; and
   sending a completion command to the service provider;
   wherein the service provider generates a publicly accessible web page based on first and second sets of information.

15. A method of composing a web page for an entity, performed by a server system having one or more processors and memory storing one or more programs for execution by the one or more processors, comprising:
   receiving a telephone call from a telephone having an associated telephone number, and wherein the telephone number is associated with the entity;
   sending an audible message listing a first set of information corresponding to the entity and the telephone number;
   receiving a response from a user of the telephone, wherein the response indicates whether the first set of information is accurate with respect to the entity;
   sending an audible prompt to request a second set of information concerning the entity; and
   receiving the second set of information concerning the entity; and
   generating a publicly accessible web page based on the first and second sets of information.

16. The method of claim 15, wherein the first set of information includes information obtained from an Internet search engine.

17. The method of claim 15, wherein at least one of the first and second sets of information includes a business type identifier, and wherein the web page is formatted in accordance with a web page template corresponding to the business type identifier.

18. A method of composing a web page for an entity, performed by a server system having one or more processors and memory storing one or more programs for execution by the one or more processors, comprising:
   sending by post to the entity a mailing that includes a passcode;
   receiving a telephone call;
   during the telephone call, performing the operations of:
      receiving the passcode from a user of the telephone;
      sending an audible message listing a first set of information associated with the entity and the passcode;
      receiving a response from the user, wherein the response indicates whether the first set of information is accurate with respect to the entity; and
      sending one or more audible prompts, and receiving one or more responses that provide a second set of information concerning the entity; and
   generating a publicly accessible web page based on the first and second sets of information.

19. The method of claim 18, including, prior to sending the mailing, electronically storing at least one record associating at least a portion of the first set of information with the passcode and the entity.

20. A system, coupled to a telephone network, for composing a web page for an entity, the system comprising;
   a processor;
   an interface to the telephone network; and
   memory storing one or more procedures executable by the processor, the one or more procedures comprising:
      instructions for receiving a telephone call from a telephone to a service provider, wherein the telephone has an associated telephone number, and wherein the telephone number is associated with the entity;
      instructions for sending, via the telephone call, an audible message listing a first set of information associated with the entity and the telephone number;
      instructions for receiving, via the telephone call, a response from a user of the telephone, wherein the response indicates whether the first set of information is accurate with respect to the entity;
      instructions for sending, via the telephone call, an audible prompt to request a second set of information concerning the entity;
      instructions for receiving, via the telephone call, the second set of information concerning the entity; and
      instructions for generating a publicly accessible web page based on the first and second sets of information.

21. The system of claim 20, wherein the one or more procedures including instructions for receiving, during the telephone call, a passcode associated with the entity, and instructions for associating the entity with the received passcode.

22. The system of claim 21, wherein the one or more procedures including instructions for accessing a database to obtain the first set of information.

23. The system of claim 20, wherein the one or more procedures including instructions for receiving a caller identifier, including the telephone number associated with the telephone, and for associating the telephone number with entity.

24. The system of claim 20, wherein the first set of information is digitally stored by the system, the one or more procedures including instructions for converting at least a portion of the digitally stored first set of information into the audible message.

25. The system of claim 20, wherein the second set of information includes information received as audible speech.

26. A system, coupled to a telephone network, for composing a web page for an entity, the system comprising;
   a processor;
   an interface to the telephone network; and
   memory storing one or more procedures executable by the processor, the one or more procedures comprising:
      instructions for sending by post to the entity a mailing that includes a passcode;
      instructions for receiving a telephone call from a telephone to a service provider;
      instructions for receiving, during the telephone call, the passcode from a user of the telephone, and for associating the received passcode with the entity;
      instructions for sending, via the telephone call, an audible message listing a first set of information associated with the entity and the passcode;
      instructions for receiving, via the telephone call, a response from the user of the telephone, wherein the response indicates whether the first set of information is accurate with respect to the entity;
      instructions for sending, via the telephone call, an audible prompt to request a second set of information concerning the entity;
      instructions for receiving, via the telephone call, the second set of information concerning the entity; and
      instructions for generating a publicly accessible web page based on the first and second sets of information.

* * * * *